United States Patent
Fujita et al.

(10) Patent No.: US 9,260,074 B2
(45) Date of Patent: Feb. 16, 2016

(54) VEHICLE INTERIOR PANEL AND VEHICLE AIRBAG APPARATUS

(71) Applicant: TOYODA GOSEI CO., LTD., Kiyosu-shi, Aichi-ken (JP)

(72) Inventors: Junichi Fujita, Kiyosu (JP); Minoru Toda, Kiyosu (JP); Chiharu Totani, Kiyosu (JP); Shunta Asakuma, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/529,205

(22) Filed: Oct. 31, 2014

(65) Prior Publication Data
US 2015/0130169 A1    May 14, 2015

(30) Foreign Application Priority Data
Nov. 11, 2013 (JP) ................................. 2013-233356

(51) Int. Cl.
*B60R 21/217* (2011.01)
*B60R 21/2165* (2011.01)

(52) U.S. Cl.
CPC ........... *B60R 21/2165* (2013.01); *B60R 21/217* (2013.01); *B60R 2021/2172* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,632,914 A | * | 5/1997 | Hagenow et al. | 219/121.71 |
| 5,698,283 A | * | 12/1997 | Yamasaki et al. | 428/43 |
| 5,979,931 A | * | 11/1999 | Totani et al. | 280/728.3 |
| 6,109,645 A | | 8/2000 | Totani et al. | |
| 6,237,933 B1 | * | 5/2001 | Takahashi et al. | 280/728.3 |
| 6,523,237 B1 | * | 2/2003 | Kopec et al. | 29/91.1 |
| 6,612,607 B1 | * | 9/2003 | Takahashi | 280/728.3 |
| 6,740,607 B2 | * | 5/2004 | Veiga et al. | 442/149 |
| 7,082,846 B2 | * | 8/2006 | Takata | 73/862.391 |
| 7,496,457 B2 | * | 2/2009 | Fujita et al. | 702/56 |
| 7,900,956 B2 | * | 3/2011 | Megliola et al. | 280/728.3 |
| 7,989,052 B2 | * | 8/2011 | Hehn et al. | 428/190 |
| 8,408,595 B2 | * | 4/2013 | Schindzielorz et al. | 280/743.1 |
| 8,511,706 B2 | * | 8/2013 | Kalisz | 280/728.2 |
| 2009/0127838 A1 | * | 5/2009 | Hayashi | 280/731 |
| 2012/0237712 A1 | * | 9/2012 | Thielhorn | 428/43 |
| 2014/0110921 A1 | * | 4/2014 | Takahashi et al. | 280/728.3 |
| 2014/0183845 A1 | * | 7/2014 | Topart | 280/728.3 |
| 2014/0300090 A1 | * | 10/2014 | Pechnyk et al. | 280/732 |
| 2014/0333052 A1 | * | 11/2014 | Fujita et al. | 280/728.3 |

FOREIGN PATENT DOCUMENTS

JP     2000-071926 A     3/2000

* cited by examiner

*Primary Examiner* — Nicole Verley
(74) *Attorney, Agent, or Firm* — Posz Law Group, PLC

(57) ABSTRACT

An instrument panel has a base member and a cover member, which is adhered to the top surface of the base member. A first cleavage groove serving as a start point of rupture of the base member caused by inflation pressure of an airbag is formed in the back surface of the base member. The cover member is configured by a ground fabric layer, a cover layer adhered to the top surface of the ground fabric layer, and a cushion layer adhered to the back surface of the ground fabric layer. The cushion layer is formed of a knitted original fabric. A second cleavage groove is formed only in the back surface of the cushion layer out of the layers configuring the cover member in correspondence with the first cleavage groove of the base member.

14 Claims, 7 Drawing Sheets

VEHICLE INTERIOR PANEL AND VEHICLE AIRBAG APPARATUS

BACKGROUND OF THE INVENTION

The present invention relates to a vehicle interior panel and a vehicle airbag apparatus.

Conventionally, an automobile includes an airbag apparatus for a front passenger seat (see, for example, Japanese Laid-Open Patent Publication No. 2000-71926). The airbag apparatus includes an instrument panel and an airbag module, which is arranged at the backside of the instrument panel. The airbag module has an inflator for generating inflation gas and an airbag, which is inflated and deployed by the gas supplied from the inflator. The instrument panel includes a base member and a cover member, which is adhered to the top surface of the base member. The cover member is configured by a ground fabric layer, a cover layer adhered to the top surface of the ground fabric layer, and a cushion layer adhered to the back surface of the ground fabric layer. The back surface of the base member has a cleavage groove, which is the start point of rupture of the base member caused by inflation pressure of the airbag.

For example, a conventional instrument panel 310 shown in FIG. 9 has a cushion layer 323, which is formed, for example, of a double-raschel knitted original fabric to provide luxurious tactile sensation. In the instrument panel 310 configured in this manner, a cover member 320 resists rupture when an airbag inflates. Accordingly, a cleavage groove is formed in the back surface of the cover member 320 at the position corresponding to a cleavage groove 331 of the aforementioned base member 330. In other words, a cleavage groove 323a, which is located in correspondence with the cleavage groove 331 of the base member 330, is formed in the cushion layer 323. The ground fabric layer 322 and the cover layer 321 are adhered to each other in advance. The ground fabric layer 322 and the cover layer 321 each have a predetermined thickness and thus exhibit improved strength. This makes the ground fabric layer 322 and the cover layer 321 resistant to rupture when the airbag inflates. Accordingly, to ensure desired rupture of the ground fabric layer 322 and the cover layer 321, a cleavage groove 322a is formed also in the ground fabric layer 322 in a manner extending through the ground fabric layer 322. Further, the cover layer 321 has a cleavage groove 321a, which is formed only in the back surface of the cover layer 321 not to spoil the appearance of the instrument panel 310.

In the instrument panel 310 configured in the above-described manner, the cushion layer 323, the ground fabric layer 322, and the cover layer 321, which configure the cover member 320, have the cleavage grooves 323a, 322a, 321a, respectively. This configuration necessitates a step of forming the cleavage groove 323a in the cushion layer 323 and a step of forming the cleavage grooves 322a, 321a in advance in a layered body formed by adhering the cover layer 321 to the top surface of the ground fabric layer 322. Additionally, when the layered body is adhered to the top surface of the cushion layer 323 in advance, the cleavage grooves 323a, 322a, 321a must be positioned to coincide with one another. This complicates the steps of manufacturing the instrument panel 310.

To solve this problem, the inventors of the present invention considered reducing the thicknesses of the ground fabric layer 222 and the cover layer 221, which configured the cover member 220. By reducing the thicknesses of the ground fabric layer 222 and the cover layer 221 to lower the strength of these layers, the layers would rupture in a desired manner even without employing the cleavage grooves in the ground fabric layer 222 and the cover layer 221. However, in this case, when the layered body, which is formed by adhering the cover layer 221 to the top surface of the ground fabric layer 222, is adhered to the top surface of the cushion layer 223, the ground fabric layer 222 and the cover layer 221 would sink into the cleavage groove 223a, which is formed in the top surface of the cushion layer 223. This would cause a dent 225 in the top surface of the cover layer 221, thus damaging the outer appearance of the instrument panel 210.

Accordingly, it is an objective of the present invention to provide a vehicle interior panel and a vehicle airbag apparatus that decrease the total thickness of a ground fabric layer and a cover layer compared to a conventional case and suppress the formation of a dent in an ornamental surface due to a cleavage groove.

SUMMARY OF THE INVENTION

To achieve the foregoing objective and in accordance with one aspect of the present invention, a vehicle interior panel constructed to be ruptured by an airbag that is inflated and deployed is provided. The interior panel includes a base member and a cover member adhered to a top surface of the base member. A cleavage groove serving as a start point of rupture of the base member caused by inflation pressure of the airbag is formed in a back surface of the base member. The cover member is configured by a ground fabric layer, a cover layer adhered to a top surface of the ground fabric layer, and a cushion layer adhered to a back surface of the ground fabric layer. The cushion layer is formed of an original fabric formed of woven fabric or knitted fabric. A cleavage groove located in correspondence with the base member is formed only in a back surface of the cushion layer out of the three layers, configuring the cover member.

In this configuration, the cleavage groove is formed only in the back surface of the cushion layer, which is formed of the woven or knitted original fabric out of the layers configuring the cover member. In other words, the top surface of the cushion layer does not have a cleavage groove. As a result, this configuration decreases the total thickness of the ground fabric layer and the cover layer compared to a conventional case, for example, and suppresses the formation of a dent in the surface of the cover layer due to the cleavage groove.

Also, since neither the ground fabric layer nor the cover layer has a cleavage groove, it is unnecessary to position the ground fabric layer and the cushion layer relative to each other when the cushion layer is adhered to the back surface of the ground fabric layer. As a result, this configuration decreases the total thickness of the ground fabric layer and the cover layer compared to a conventional case and suppresses the formation of a dent in an ornamental surface due to a cleavage groove.

In this case, a total thickness of the ground fabric layer and the cover layer is preferably in a range between 0.3 mm and 1.0 mm, inclusive.

This configuration reduces rupture load of the ground fabric layer and the cover layer compared to a conventional case. Accordingly, in the configuration, although the force transmitted to the ground fabric layer is small compared to a configuration having a cleavage groove extending through a cushion layer, the ground fabric layer and the cover layer are easily ruptured when the cushion layer is ruptured.

The cushion layer is preferably formed of a three-dimensionally knitted original fabric.

In this configuration, the cushion layer is formed of the three-dimensionally knitted original fabric. This improves stretch properties of the cushion layer and, also, stretch properties and softness of the cover layer compared to a cushion layer formed of a woven original fabric. Particularly, if the cushion layer is formed of warp-knitted original fabric, the knitted fabric is stabilized.

In this case, the cushion layer is preferably formed of a double-raschel knitted original fabric.

In this configuration, the cushion layer is formed of a double-raschel knitted original fabric. This enhances cushion performance of the cushion layer and improves the tactile sensation of the interior panel compared to a cushion layer formed of an original fabric of foamed urethane or the like.

The cleavage groove of the cushion layer is preferably formed in a perforated manner.

In this configuration, it is unlikely that the cleavage groove will open when the base member is adhered to the back surface of the cushion layer. This suppresses the formation of a dent in the surface of the cover layer due to a cleavage groove.

Further, to achieve the foregoing objective, the present invention provides a vehicle airbag apparatus that includes the above described vehicle interior panel and an airbag module having an airbag that is inflated and deployed by supply of gas.

DETAILED DESCRIPTION OF THE PREFERRED EMBODIMENTS

A vehicle interior panel and a vehicle airbag apparatus according to one embodiment will now be described with reference to FIGS. 1 to 7.

Figure 1:
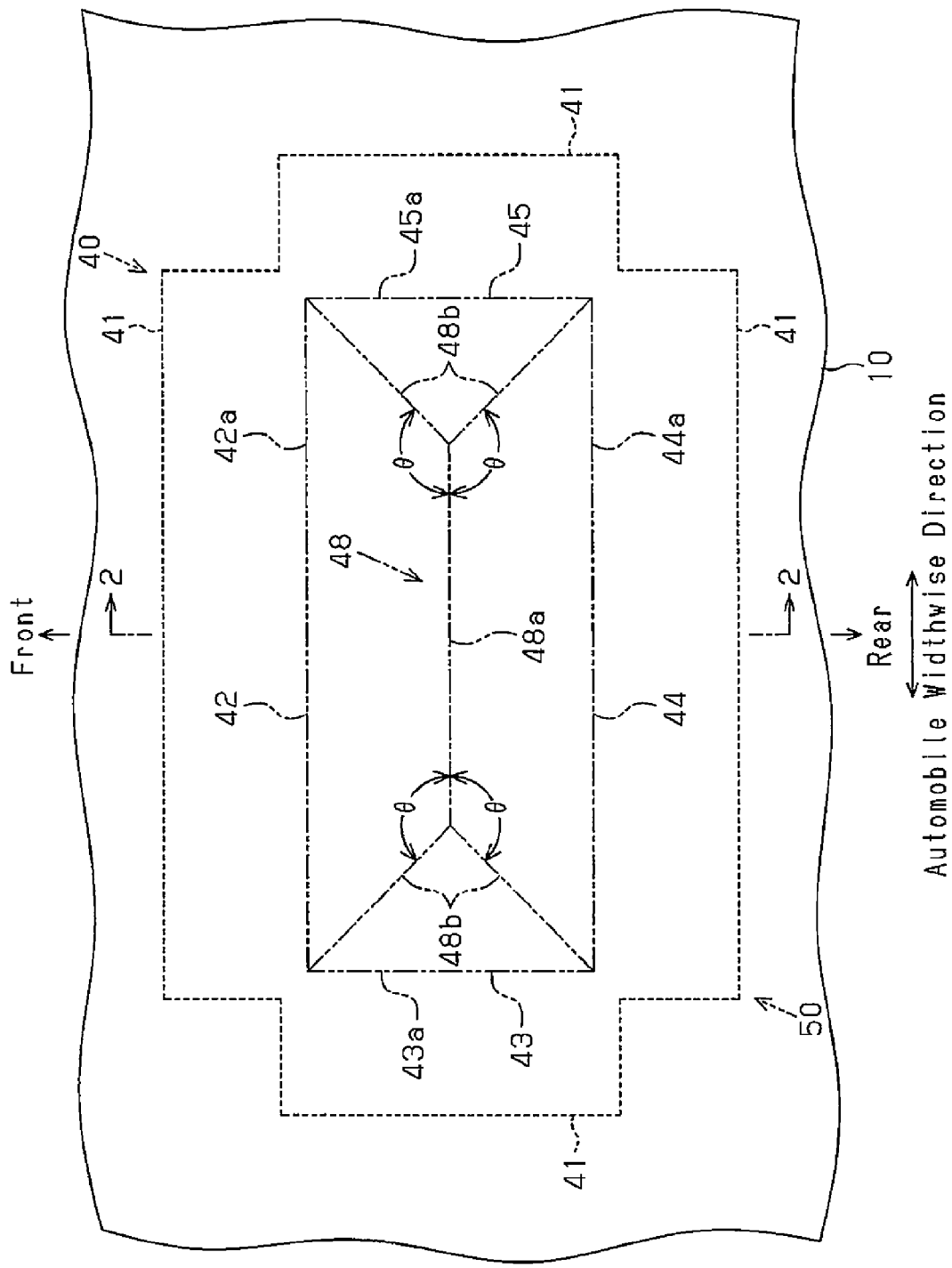
FIG. 1 is a plan view showing an instrument panel according to one embodiment.

As shown in FIG. 1, an instrument panel 10 is arranged in front of the front passenger seat of a vehicle.

Figure 2:
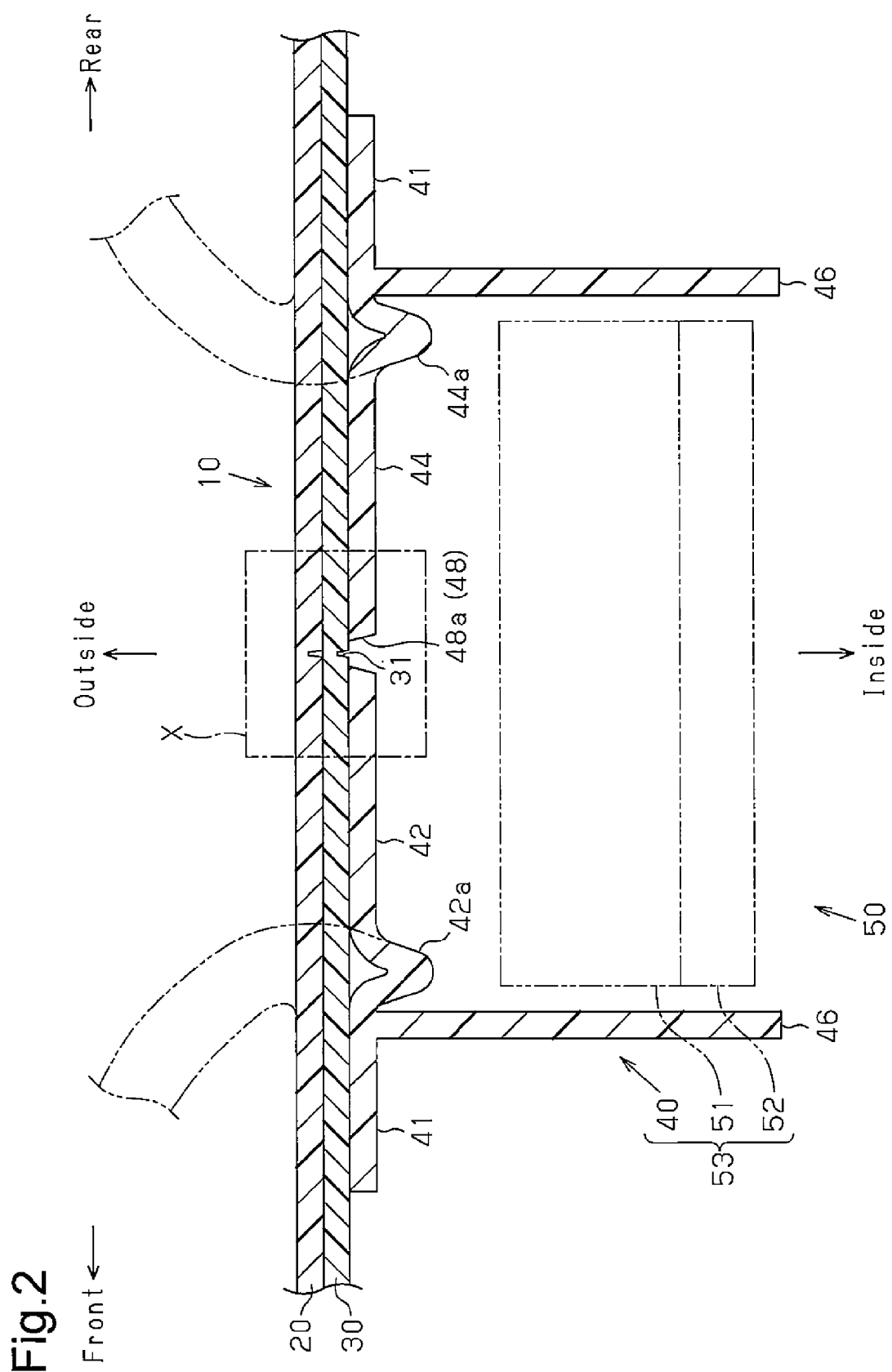
FIG. 2 is a cross-sectional view taken along line 2-2 of FIG. 1.

With reference to FIG. 2, an airbag apparatus 50 is provided at the backside of the instrument panel 10 to protect an occupant from impact by inflating and deploying an airbag 51 at a position forward of the front passenger seat when the impact is applied to the vehicle from front.

A retainer 40 is arranged on the back surface of a portion of the instrument panel 10 located forward of the front passenger seat. The retainer 40 retains an airbag 51 in a folded state and an inflator 52 for generating gas for inflating the airbag 51. The retainer 40, the inflator 52, and the airbag 51 configure an airbag module 53.

The retainer 40 includes a pair of wall portions 46 arranged in the front-rear direction. The airbag 51 and the inflator 52 are held between the wall portions 46. An extended portion 41 is formed at an upper end of each of the wall portions 46 and extended forward or rearward on the back surface of the instrument panel 10. A front door portion 42 and a rear door portion 44 are connected to the upper ends of the corresponding wall portions 46 via corresponding hinge portions 42a, 44a. A first groove portion 48a of a through groove 48 extends in the vehicle widthwise direction at a position between the front door portion 42 and the rear door portion 44.

Although not illustrated, wall portions similar to the wall portions 46 are formed on opposite sides of the airbag 51 and the inflator 52 in the vehicle widthwise direction. As illustrated in FIG. 1, at the upper ends of the wall portions, each of extended portions 41, which extends outward in the vehicle widthwise direction via corresponding hinge portions 43a, 45a, is joined to the corresponding one of a left door portion 43 and a right door portion 45, which extend inward in the vehicle widthwise direction via the corresponding hinge portions 43a, 45a. Second groove portions 48b, each of which has a horizontal V shape, are formed at the opposite ends of the first groove portion 48a of the through groove 48. The second groove portions 48b configure boundaries between the front door portion 42, the left door portion 43, and the right door portion 45 and between the rear door portion 44, the left door portion 43, and the right door portion 45.

The angle formed by the first groove portion 48a and any of the second groove portions 48b is set to an obtuse angle. In the illustrated embodiment, the angle θ formed by the first groove portion 48a and any of the second groove portions 48b is set to 135 degrees.

The retainer 40 is formed of, for example, thermoplastic olefin and formed by injection molding. A plurality of projections is formed on the top surfaces of the extended portions 41, the front door portion 42, and the rear door portion 44. The projections are fixed to the back surface of the instrument panel 10 by vibration welding.

The structure of the instrument panel 10 will hereafter be described.

Figure 3:
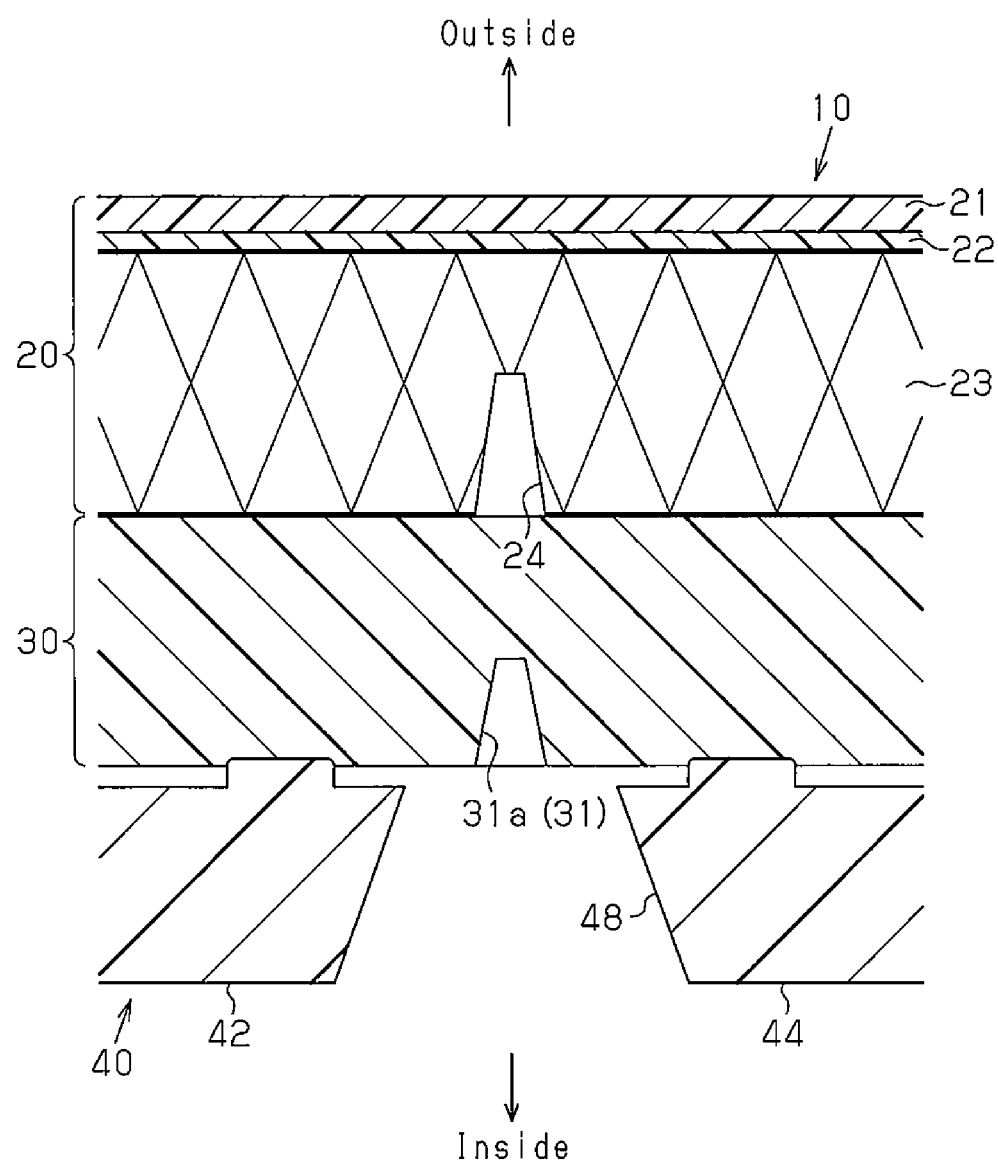
FIG. 3 is an enlarged cross-sectional view showing portion X of FIG. 2.

As shown in FIGS. 2 and 3, the instrument panel 10 has a base member 30 serving as a core and a cover member 20, which is bonded to the top surface of the base member 30.

The base member 30 is formed of, for example, thermoplastic olefin (TPO), and formed by injection molding.

The cover member 20 has a three layer structure including a ground fabric layer 22, a cover layer 21, and a cushion layer 23. The cover layer 21 is bonded to the top surface of the ground fabric layer 22. The cushion layer 23 is bonded to the back surface of the ground fabric layer 22. Specifically, a layered body formed by bonding the cover layer 21, to the top surface of the ground fabric layer 22 in advance, is bonded to the top surface of the cushion layer 23 to form the cover member 20. The total thickness of the ground fabric layer 22 and the cover layer 21 is in the range between 0.3 mm and 1.0 mm, inclusive. More preferably, the total thickness of the ground fabric layer 22 and the cover layer 21 is 0.4 to 0.7 mm. If the aforementioned total thickness is greater than 1.0 mm, for example, the ground fabric layer 22 and the cover layer 21 cannot be ruptured in a desired manner. Such total thickness is thus not preferable. If the total thickness is smaller than 0.3 mm, the strength of the layered body cannot be ensured when the layered body is adhered to the top surface of the cushion layer 23. Such total thickness is thus not preferable, either.

The original fabric of the cover layer 21 is formed of, for example, polyurethane and does not have anisotropy in tensile strength in directions on the plane defined by the original fabric.

Figure 4:
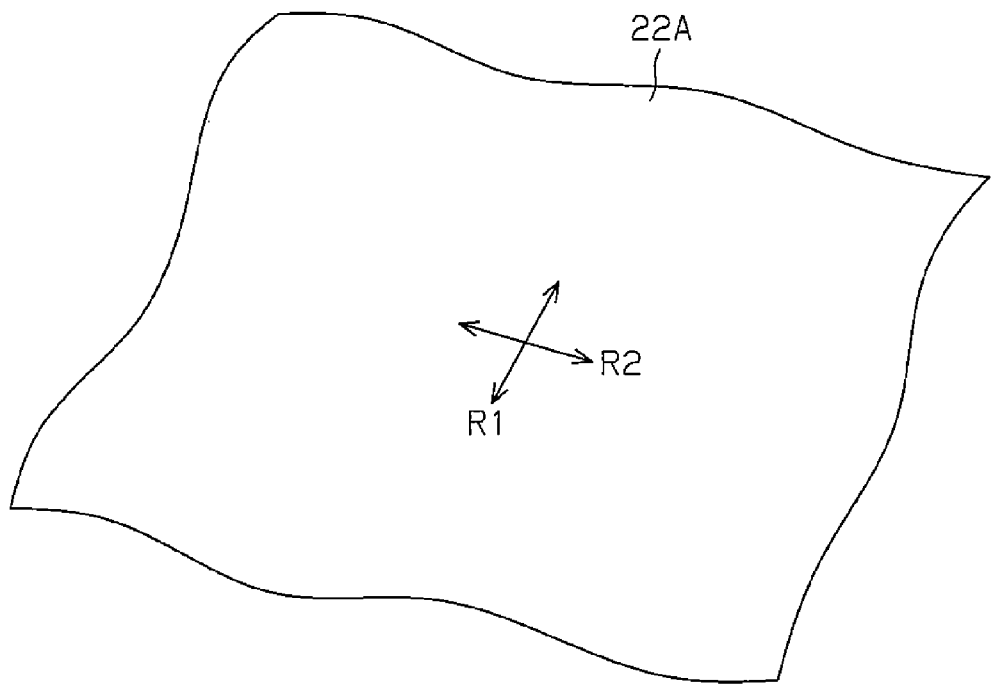
FIG. 4 is a diagram illustrating tensile strength anisotropy of original fabric of a ground fabric layer in directions on a plane defined by the original fabric.

With reference to FIG. 4, an original fabric 22A of the ground fabric layer 22 is formed of knitted fabric of plastic fibers such as polyester fibers and has anisotropy in tensile strength in directions on the plane defined by the original fabric. In other words, the original fabric 22A has the minimum tensile strength in a predetermined direction R1 on the plane and the maximum tensile strength in a direction R2, which is perpendicular to the direction R1.

Figure 5:
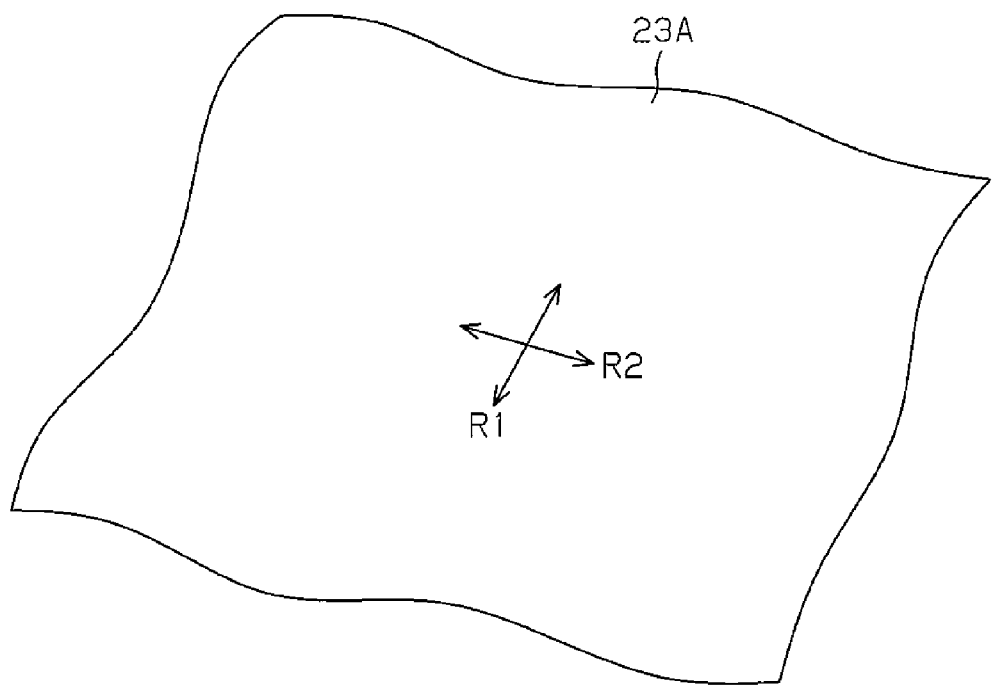
FIG. 5 is a diagram illustrating tensile strength anisotropy of original fabric of a cushion layer in directions on a plane defined by the original fabric.

As illustrated in FIG. 5, an original fabric 23A of the cushion layer 23 is configured by, for example, three-dimensional knitted fabric. Specifically, the original fabric 23A of the cushion layer 23 is formed of double-raschel knitted fabric of plastic fibers such as polyester fibers and has anisotropy in tensile strength in directions on the plane defined by the original fabric 23A. In other words, the original fabric 23A has the minimum tensile strength in the predetermined direction R1 on the plane and the maximum tensile strength in the direction R2, which is perpendicular to the direction R1. The thickness of the cushion layer 23 is preferably 2.5 mm to 3.0 mm. It is also preferable that the cushion layer 23 be formed by knitting threads having a diameter in the range of 0.01 mm to 1.0 mm. For example, if the diameter of the thread were greater than 1.0 mm, the cushion layer 23 would be loosely knitted. This would hamper adhesion by adhesive and is thus not preferable. For example, if the diameter of the threads were smaller than 0.01 mm, the cushion layer 23 would be finely knitted. This would increase the strength of the cushion layer 23 and thus hamper rupture of the cushion layer 23, and is thus not preferable. It is thus more preferable that the diameter of the thread be in the range of 0.05 mm to 0.5 mm. In the present embodiment, a thread with a diameter of 0.5 mm is used.

The ground fabric layer 22 and the cushion layer 23 are bonded together such that the direction R1 corresponding to the minimum tensile strength of the ground fabric layer 22 coincides with the direction R1 corresponding to the minimum tensile strength of the cushion layer 23. As a result, the cover member 20 has minimum tensile strength in the direction R1.

Figure 6:
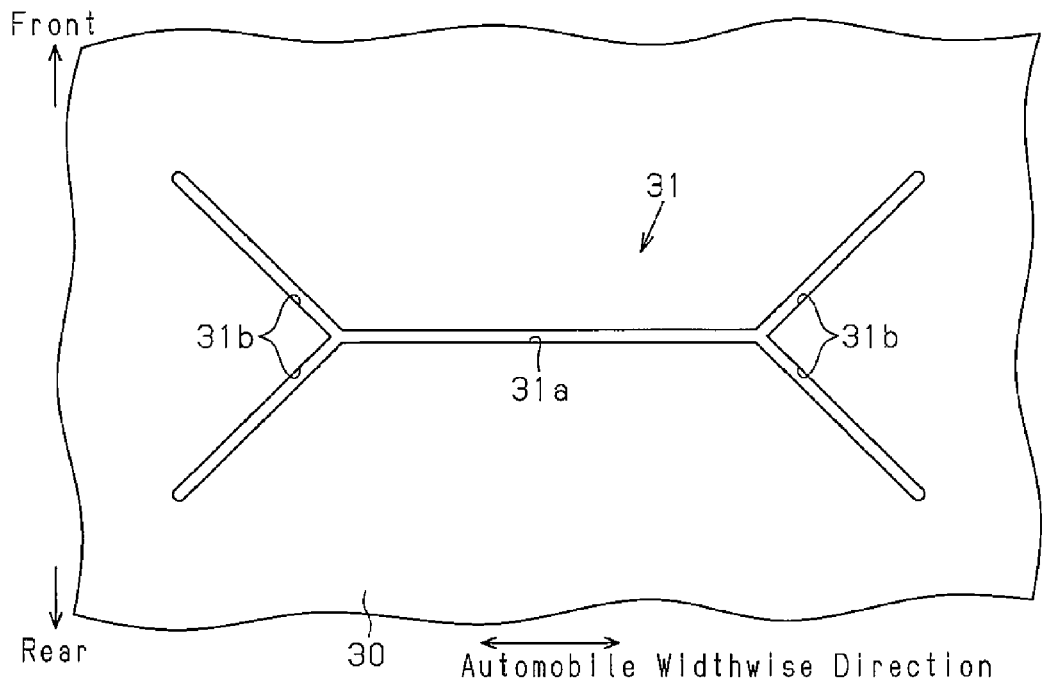
FIG. 6 is a plan view showing a base member of the embodiment as viewed from the backside.

As illustrated in FIGS. 3 and 6, the back surface of the base member 30 has a first cleavage groove 31 having a trapezoidal cross section. The first cleavage groove 31 is the start point of rupture of the base member 30 caused by inflation pressure of the airbag 51. Accordingly, the thickness of the portion of the base member 30 corresponding to the first cleavage groove 31 is smaller than thicknesses of the other portions. In the present embodiment, the width of the distal end of the first cleavage groove 31 is set to approximately 1.0 mm.

With reference to FIG. 6, the first cleavage groove 31 is formed by a first groove portion 31a and second groove portions 31b. The first groove portion 31a extends in the vehicle widthwise direction. The second groove portions 31b extend from the opposite ends of the first groove portion 31a outward in the vehicle widthwise direction and diagonally forward or rearward, thus forming horizontal V shapes. With reference to FIGS. 1 to 3 and 6, the cleavage groove 31 is located on the top side of the through groove 48 of the retainer 40.

As illustrated in FIG. 3, out of the cover layer 21, the ground fabric layer 22, and the cushion layer 23, which configure the cover member 20, only the back surface of the cushion layer 23 has a second cleavage groove 24 having a trapezoidal cross section, which is located in correspondence with the first cleavage groove 31 of the base member 30. The second cleavage groove 24 extends from the back surface of the cushion layer 23 to a middle position in the thickness of the cushion layer 23 and thus does not extend through the cushion layer 23. In the present embodiment, the width of the distal end of the second cleavage groove 24 is set to approximately 1.0 mm.

Figure 7:
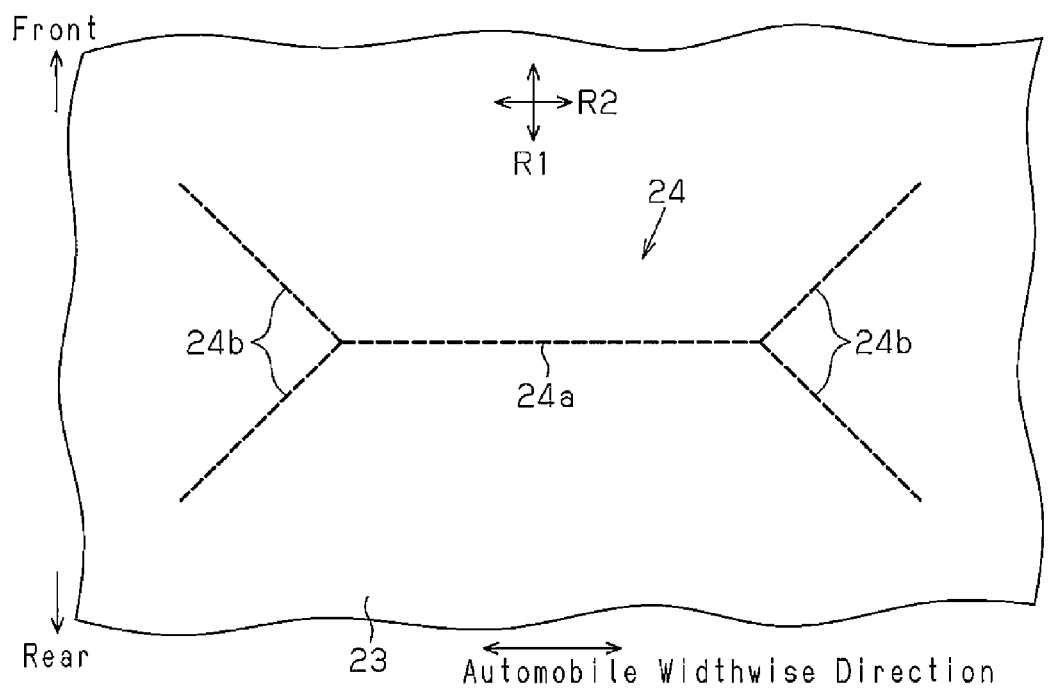
FIG. 7 is a plan view showing a cushion layer of the embodiment as viewed from the backside.

Referring to FIGS. 6 and 7, the second cleavage groove 24 of the cushion layer 23 has a first groove portion 24a and second groove portions 24b. The first groove portion 24a is formed at the position corresponding to the first groove portion 31a of the first cleavage groove 31 of the base member 30. The second groove portions 24b are formed at the positions corresponding to the second groove portions 31b of the first cleavage groove 31 of the base member 30. Specifically, the second cleavage groove 24 of the cushion layer 23 is formed in a perforated manner, or, in other words, in a manner non-continuous in the direction in which the second cleavage groove 24 extends. It is preferred that the cover member 20 be bonded to the base member 30 such that the position of the second cleavage groove 24 of the cushion layer 23 coincides with the position of the first cleavage groove 31 of the base member 30.

As illustrated in FIG. 7, the second cleavage groove 24 is formed in the cushion layer 23 such that the extending direction of the first groove portion 24a extends in the direction R2 corresponding to the maximum tensile strength of the cushion layer 23.

As a method of forming the second cleavage groove 24 in the back surface of the cushion layer 23, machining using a Thomson blade, machining using a cold knife or a hot knife, or laser machining may be employed. The machining using a Thomson blade is advantageous compared to other types of machining in terms of costs for the production line. Particularly, among various types of the Thomson blade, a mirror blade has small variation in the blade height compared to other types of Thomson blade. The mirror blade thus improves machining accuracy of the second cleavage groove 24 in a desired manner. The laser machining facilitates improvement of the machining accuracy of the second cleavage groove 24 in a desired manner.

Operation of the present embodiment will hereafter be described.

If the automobile receives impact from front, the inflator 52 supplies gas to the airbag 51. The gas inflates the airbag 51 toward the door portions 42, 44 of the retainer 40. Then, as represented by the long dashed double-short dashed lines in FIG. 2, the door portions 42, 44 are pressed open upward by inflation pressure of the airbag 51 while being supported by the corresponding hinge portions 42a, 44a. In addition to the upper and lower door portions 42, 44, the left and right door portions 43, 45 shown in FIG. 1 are pressed open upward while being supported by the corresponding hinge portions 43a, 45a.

At this stage, the base member 30 is pressed upward through the door portions 42, 44 of the retainer 40. This causes the base member 30 of the instrument panel 10 to rupture in the front-rear direction first from the first groove portion 31a, which serves as the start point. The portions of the base member 30 corresponding to the door portions 42, 44 are thus pressed open upward.

Since the base member 30 is pressed open upward in the above-described manner, tension is caused in the first groove portion 24a of the cushion layer 23 in the front-rear direction. The cushion layer 23 thus ruptures in the vehicle widthwise direction from the middle portion of the cushion layer 23 in the vehicle widthwise direction, with the middle portion serving as the start point, and is pressed open upward. Specifically, the tensile strength of the cushion layer 23 and the tensile strength of the ground fabric layer 22 are set to the minimum values in the front-rear direction of the vehicle. This ensures smooth rupture of the cushion layer 23 in the front-rear direction from the first groove portion 24a, which serves as the start point, and smooth rupture of the ground fabric layer 22 and the cover layer 21 in the front-rear direction from the portions of the ground fabric layer 22 and the cover layer 21 corresponding to the first groove portion 31a as the start points.

In this manner, the first groove portion 31a of the base member 30 and the first groove portion 24a of the cushion layer 23 rupture continuously to the opposite ends in the vehicle widthwise direction. Such rupture is followed by rupture of each of the second groove portions 31b, 24b, which extend in a horizontal V shape from the opposite ends of the first groove portions 31a, 24a.

In the present embodiment, the second cleavage groove 24 is formed only in the back surface of the cushion layer 23, which is formed of the original fabric 23A of double raschel knitted fabric, out of the layers 21, 22, 23 configuring the cover member 20. In other words, the top surface of the cushion layer 23 does not have a cleavage groove. As a result, this configuration decreases the total thickness of the ground fabric layer 22 and the cover layer 21 compared to a conventional case (for example, 1.3 mm), and suppresses the formation of a dent caused by the second cleavage groove 24 in the top surface of the cover layer 21, which is the ornamental surface of the instrument panel 10.

No cleavage grooves are formed in the ground fabric layer 22 or the cover layer 21. Accordingly, when the cushion layer 23 is adhered to the back surface of the ground fabric layer 22, it is unnecessary to position the ground fabric layer 22 and the cushion layer 23 relative to each other.

The vehicle interior panel and the vehicle airbag apparatus of the present embodiment, which have been described above, have the advantages described below.

(1) The cover member 20 is configured by the ground fabric layer 22, the cover layer 21 adhered to the top surface of the ground fabric layer 22, and the cushion layer 23 adhered to the back surface of the ground fabric layer 22. The cushion layer 23 is formed of the knitted original fabric 23A. The second cleavage groove 24 is formed only in the back surface of the cushion layer 23 out of the layers 21, 22, 23, which configure the cover member 20, in correspondence with the first cleavage groove 31 of the base member 30. This configuration easily reduces the total thickness of the ground fabric layer 22 and the cover layer 21 compared to a conventional case and suppresses the formation of a dent in the ornamental surface of the instrument panel 10 due to the second cleavage groove 24.

(2) The total thickness of the ground fabric layer 22 and the cover layer 21 is between 0.3 and 0.1, inclusive. This configuration decreases rupture load of the ground fabric layer 22 and the cover layer 21 compared to a conventional case. As a result, in the present embodiment, although the force transmitted to the ground fabric layer 22 when the airbag 51 inflates decreases compared to a configuration having a cleavage groove extending through a cushion layer, the ground fabric layer 22 and the cover layer 21 rupture easily when the cushion layer 23 ruptures.

(3) The cushion layer 23 is formed of the original fabric 23A of double-raschel knitted fabric. This configuration improves stretch properties and softness of the cushion layer 23 and also stretch properties and softness of the cover member 20 compared to a case with a cushion layer formed of woven original fabric. Also, compared to a cushion layer formed of original fabric of foamed urethane, the instrument panel 10 is given luxurious tactile sensation.

(4) The second cleavage groove 24 of the cushion layer 23 is formed in a perforated manner. In this configuration, the perforated second cleavage groove 24 of the cushion layer 23 makes it unlikely that the second cleavage groove 24 will open when the base member 30 is adhered to the back surface of the cushion layer 23. As a result, a dent is unlikely to be formed by the second cleavage groove 24 in the top surface of the cover layer 21, which is the ornamental surface of the instrument panel 10.

(5) The angle θ between the first groove portion 24a and each second groove portion 24b of the cleavage groove 24 and the angle θ between the first groove portion 31a and each second groove portion 31b of the cleavage groove 31 are both set to an obtuse angle (for example, 135 degrees). Accordingly, using the force by which each first groove portion 24a, 31a is cut open outward from middle portions of the base member 30 and the cushion layer 23 in the vehicle widthwise direction serving as the start point, the corresponding second groove portions 24b, 31b are smoothly ruptured.

The vehicle interior panel and the vehicle airbag apparatus according to the present invention are not restricted to the configurations of the above illustrated embodiment but may be embodied in, for example, the forms described below, which are modifications from the present embodiment.

The position of the second cleavage groove 24 of the cushion layer 23 and the position of the first cleavage groove 31 of the base member 30 do not necessarily have to fully coincide with each other. As long as the offset amount of these positions is not greater than approximately 3 mm, an advantage similar to the advantage (1) of the present embodiment is ensured.

Although the above illustrated embodiment includes the cleavage grooves 24, 31 each having a trapezoidal cross section, the shape of each cleavage groove is not restricted to this. That is, the cleavage groove 24, 31 may be modified to any other suitable shape, for example, a triangular cross sectional shape.

To make it unlikely that the second cleavage groove 24 of the cushion layer 23 will open when the base member 30 is adhered to the back surface of the cushion layer 23, it is preferable to form the second cleavage groove 24 in a perforated manner as in the above illustrated embodiment. However, the shape of the cleavage groove of the cushion layer is not restricted to this. That is, the cleavage groove may be formed in a shape continuous in the extending direction of the cleavage groove as long as the cleavage groove opens only to such an extent that no problem is caused when the base member is adhered to the back surface of the cushion layer.

In the above illustrated embodiment, the through groove 48 of the retainer 40 includes the first groove portion 48a extending in the vehicle widthwise direction and the second groove portions 48b, which extend each in a horizontal V shape outward in the vehicle widthwise direction from the opposite ends of the first groove portion 48a. Also, the base member 30 and the cushion layer 23 of the cover member 20 each have the cleavage groove 24, 31, which is shaped identically with the through groove 48.

Figure 8A:
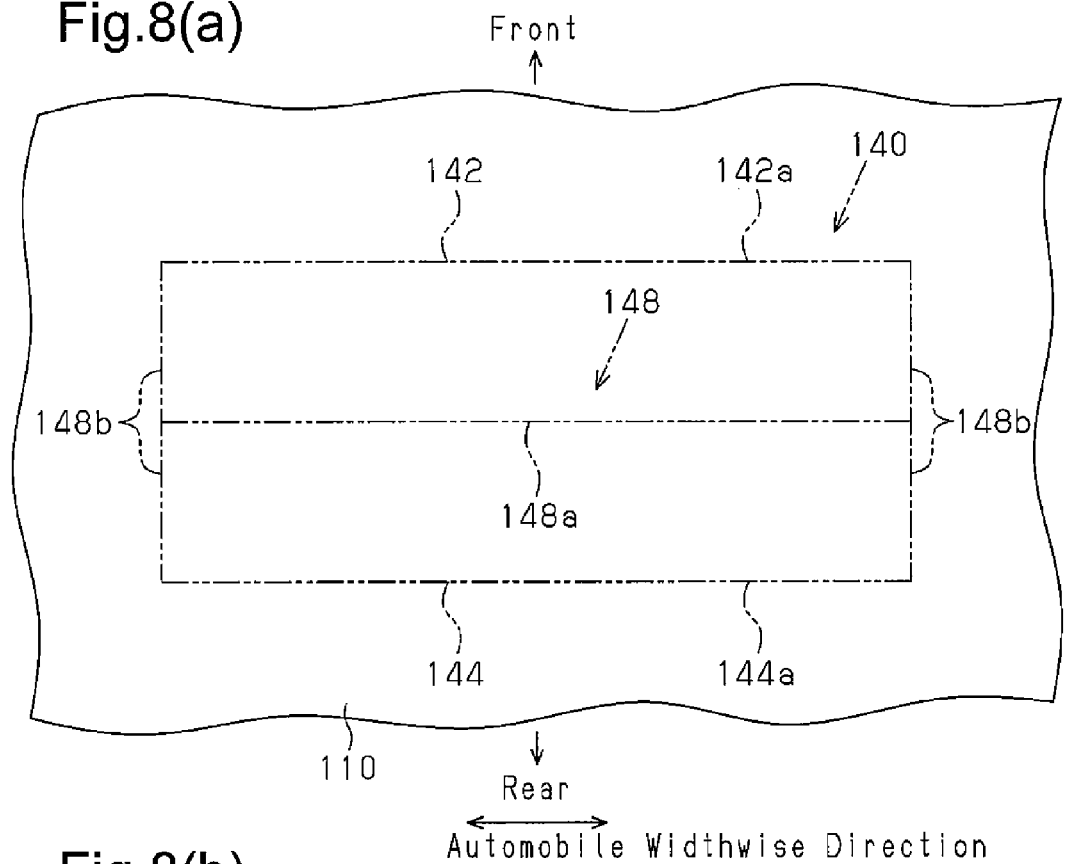
FIG. 8A is a plan view showing an instrument panel of a modification.

Instead of this configuration, referring to FIG. 8A, a through groove 148 of a retainer 140 may have a first groove portion 148a extending in the vehicle widthwise direction and second groove portions 148b extending in the front-rear directions from the opposite ends of the first groove portion 148a in a manner perpendicular to the first groove portion 148a. In this case, the cushion layers of a base member and a cover member each have a cleavage groove shaped identically with the through groove 148.

In this configuration, the retainer 140 includes a front door portion 142 and a rear door portion 144, which are located forward and rearward, respectively, to the first groove portion 148a, and inward of the second groove portions 148b in the vehicle widthwise direction. This configuration thus includes only two door portions 142, 144 and only two hinges 142a, 144a, which support the corresponding door portions 142, 144.

Figure 8B:
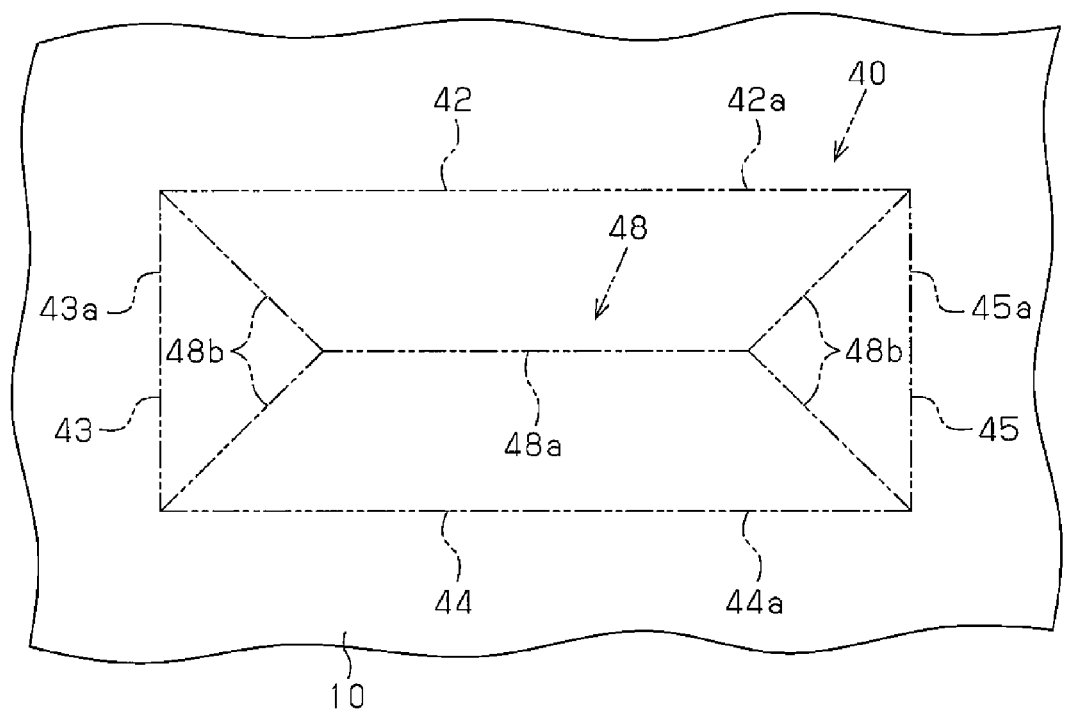
FIG. 8B is a plan view showing the instrument panel of the embodiment.
Figure 9:
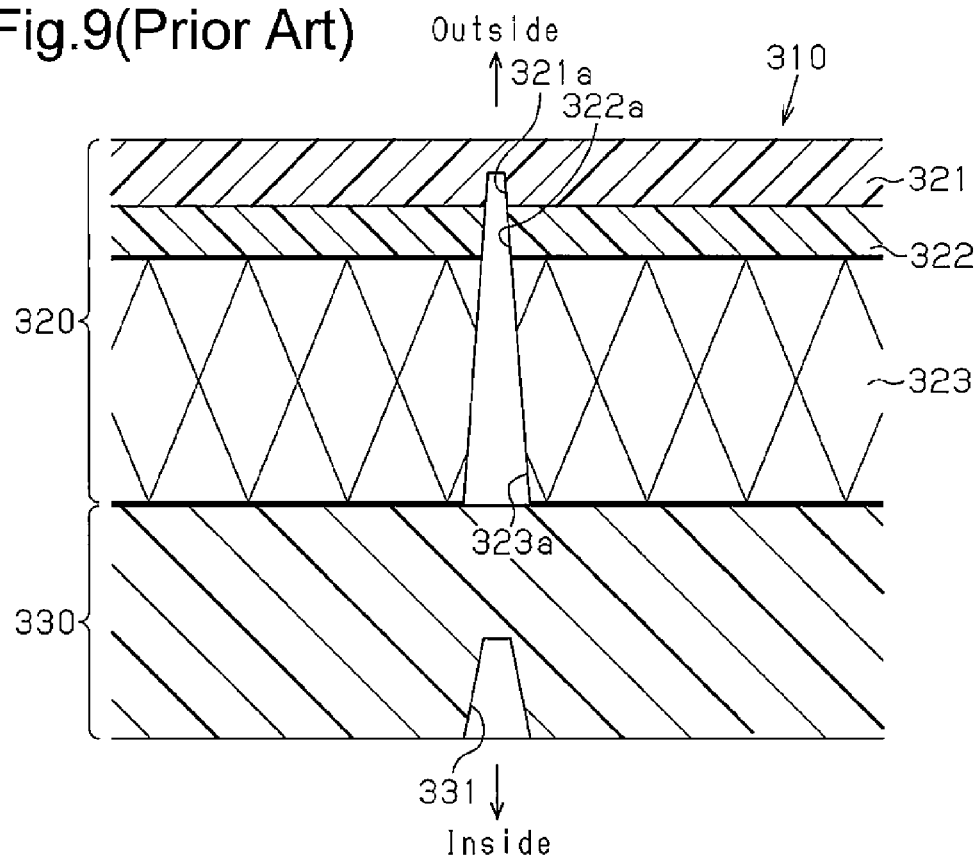
FIG. 9 is a conventional cross-sectional view showing an instrument panel.
Figure 10:
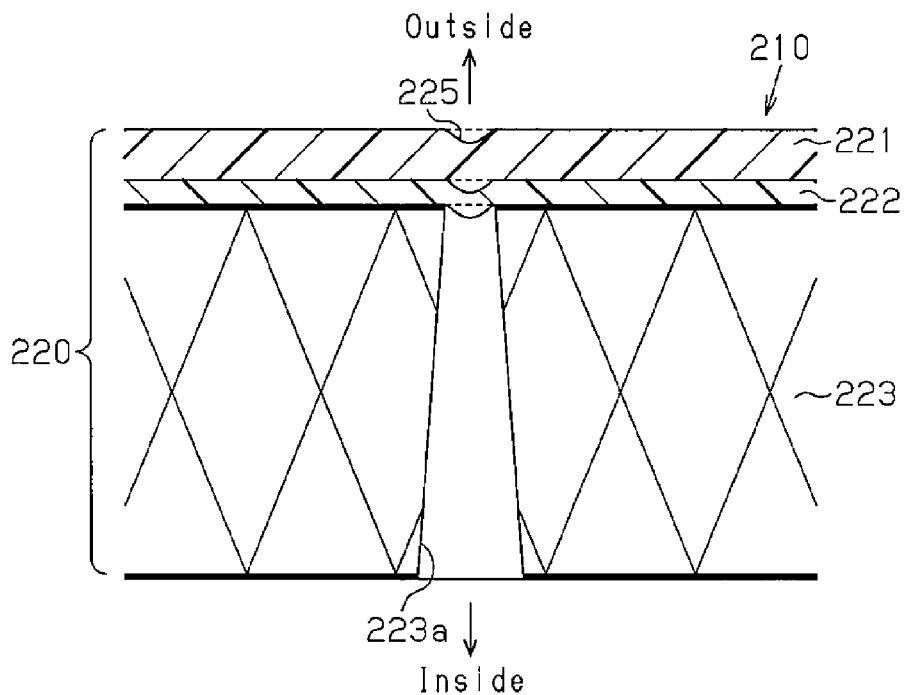
FIG. 10 is a cross-sectional view showing an instrument panel of a reference example.

In an instrument panel 110 and the retainer 140, which are configured as illustrated in FIG. 8A, the opening area at the time when the door portions are pressed open upward is great compared to the case of the above illustrated embodiment having the instrument panel 10 and the retainer 40, which is shown in FIG. 8B.

Although the cushion layer 23 is formed of the original fabric 23A of double-raschel knitted fabric, the cushion layer is not restricted to this material. For example, the cushion layer may be formed of any other suitable original fabric of three-dimensional knitted fabric, which is, for example, tricot knitted fabric.

The invention claimed is:

1. A vehicle interior panel constructed to be ruptured by an airbag that is inflated and deployed, the interior panel comprising:
   a base member; and
   a cover member adhered to a top surface of the base member, wherein
   the base member has a back surface including a first cleavage groove serving as a start point of rupture of the base member caused by inflation pressure of the airbag,
   the cover member includes a ground fabric layer, a cover layer adhered to a top surface of the ground fabric layer, and a cushion layer adhered to a back surface of the ground fabric layer,
   the cushion layer is an original fabric formed of a three-dimensionally knitted fabric,
   the cover layer and the ground fabric layer of the cover member are free of a cleavage groove, and
   the cushion layer is configured to provide a smooth rupture of the ground layer by only including and locating a second cleavage groove on a back surface of the cushion layer in correspondence with a position of the first cleavage groove along the back surface of the base member.

2. The vehicle interior panel according to claim 1, wherein a total thickness of the ground fabric layer and the cover layer is in a range between 0.3 mm and 1.0 mm, inclusive.

3. The vehicle interior panel according to claim 1, wherein the cushion layer includes a double-raschel knitted original fabric.

4. The vehicle interior panel according to claim 1, wherein the cleavage groove of the cushion layer is formed in a perforated manner.

5. A vehicle airbag apparatus comprising:
   the vehicle interior panel according to claim 1; and
   an airbag module having an airbag that is inflated and deployed by supply of gas.

6. The vehicle interior panel according to claim 1, wherein the cushion layer has anisotropy in tensile strength in directions on a plane defined by a front-rear direction of the interior panel and a direction perpendicular to the front-rear direction of the interior panel.

7. The vehicle interior panel according to claim 1, wherein the first cleavage groove in the back surface of the base layer and the second cleavage groove in the back surface of the cushion layer extend in a common direction.

8. The vehicle interior panel according to claim 1, wherein each of the first and second cleavage grooves include cleavage groove portions, and the cleavage groove portions of the first cleavage groove and the cleavage groove portions of the second cleavage groove extend in common directions.

9. The vehicle interior panel according to claim 1, wherein the cushion layer and the ground fabric layer of the cover member are configured to provide a smooth rupture of the cushion layer by having a minimum tensile strength in a front-rear direction of the vehicle panel and a maximum tensile strength in a direction perpendicular to the front-rear direction of the vehicle panel.

10. A vehicle interior panel constructed to be ruptured by an airbag that is inflated and deployed, the interior panel comprising:
    a base member; and
    a cover member having a back surface adhered to a top surface of the base member, the cover member having a top surface forming an ornamental surface of the interior panel, wherein
    the base member has a back surface including a first cleavage groove serving as a start point of rupture of the base member caused by inflation pressure of the airbag,
    the cover member includes a ground fabric layer, a cover layer adhered to a top surface of the ground fabric layer, and a cushion layer adhered to a back surface of the ground fabric layer,
    the cushion layer is a three-dimensional knitted fabric,
    the cover layer and the ground fabric layer of the cover member are free of a cleavage groove, and
    the cushion layer has a back surface including a second cleavage groove located at a position along the back surface of the cushion layer corresponding to the first cleavage groove in the back surface of the base member, and the first and second cleavage grooves are configured to reduce a total thickness of the ground fabric layer and the cover layer without formation of a dent in the ornamental surface of the interior panel.

11. The vehicle interior panel according to claim 10, wherein the cushion layer has anisotropy in tensile strength by having a minimum tensile strength in a front-rear direction of the interior panel and a maximum tensile strength in a direction perpendicular to the front-rear direction of the interior panel.

12. The vehicle interior panel according to claim 10, wherein the cushion layer and the ground fabric layer of the cover member are configured to provide a smooth rupture of the cushion layer by having a minimum tensile strength in a front-rear direction of the vehicle panel and a maximum tensile strength in a direction perpendicular to the front-rear direction of the vehicle panel.

13. The vehicle interior panel according to claim 10, wherein the first cleavage groove in the back surface of the base layer and the second cleavage groove in the back surface of the cushion layer extend in a common direction.

14. The vehicle interior panel according to claim 10, wherein each of the first and second cleavage grooves include cleavage groove portions, and the cleavage groove portions of the first cleavage groove and the cleavage groove portions of the second cleavage groove extend in common directions.

* * * * *